(12) United States Patent
Mantoam

(10) Patent No.: US 11,516,966 B2
(45) Date of Patent: Dec. 6, 2022

(54) SHAKER MECHANISM FOR AN AGRICULTURAL MACHINE AND HARVESTING MACHINE

(71) Applicant: CNH Industrial America LLC, New Holland, PA (US)

(72) Inventor: Edemilson José Mantoam, Piracicaba (BR)

(73) Assignee: CNH Industrial America LLC, New Holland, PA (US)

( * ) Notice: Subject to any disclaimer, the term of this patent is extended or adjusted under 35 U.S.C. 154(b) by 335 days.

(21) Appl. No.: 16/647,380

(22) PCT Filed: Sep. 11, 2018

(86) PCT No.: PCT/BR2018/050331
§ 371 (c)(1),
(2) Date: Mar. 13, 2020

(87) PCT Pub. No.: WO2019/051573
PCT Pub. Date: Mar. 21, 2019

(65) Prior Publication Data
US 2020/0267901 A1 Aug. 27, 2020

(30) Foreign Application Priority Data
Sep. 13, 2017 (BR) .......................... 102017019523-6

(51) Int. Cl.
*A01D 45/10* (2006.01)
*A01D 34/66* (2006.01)
(Continued)

(52) U.S. Cl.
CPC ............. *A01D 45/10* (2013.01); *A01D 34/66* (2013.01); *A01D 61/02* (2013.01); *B65G 45/08* (2013.01); *B65G 45/105* (2013.01)

(58) Field of Classification Search
CPC ........ A01D 45/10; A01D 34/66; A01D 61/02; B65G 45/08; B65G 45/105
See application file for complete search history.

(56) References Cited

U.S. PATENT DOCUMENTS 624,564 A * 5/1899 Steward ............... A01D 61/002
56/135
631,647 A * 8/1899 Locke .................... A01D 75/04
56/137
(Continued)

FOREIGN PATENT DOCUMENTS

AU  2004203845 A1  3/2005
BR  9303218-8 A    5/1994
(Continued)

OTHER PUBLICATIONS

International Search Report and Written Opinion for Application No. PCT/BR2018/050331 dated Dec. 21, 2018 (12 pages).

*Primary Examiner* — Arpad F Kovacs
(74) *Attorney, Agent, or Firm* — Peter Zacharias; Patrick Sheldrake

(57) ABSTRACT

A shaker mechanism used in an agricultural machine, such as sugarcane harvesters and sweet sorghum harvesters. The shaker mechanism is configured for removing mud, dirt and plant remains accumulated in a lower protective tarpaulin of a mounting chassis of conveyor rollers and choppers of the agricultural machine. The shaker mechanism includes at least a bar having ends which are fastened on rotary support bearings. The bar is configured to stand at least partially out from an edge of the bearings forming at least a spare surface for contact with a protective tarpaulin positioned on the chassis of the machine.

20 Claims, 4 Drawing Sheets

(51) Int. Cl.
*A01D 61/02* (2006.01)
*B65G 45/08* (2006.01)
*B65G 45/10* (2006.01)

(56) References Cited

U.S. PATENT DOCUMENTS

| | | | | |
|---|---|---|---|---|
| 1,295,331 | A | * | 2/1919 | Knotts .................... A01D 45/10 56/266 |
| 3,105,342 | A | * | 10/1963 | Hahn ...................... A01D 46/26 56/328.1 |
| 3,187,872 | A | * | 6/1965 | Hill ....................... A01D 45/006 193/7 |
| 3,220,540 | A | | 11/1965 | Frontczak |
| 3,331,198 | A | * | 7/1967 | Hill ....................... A01D 45/006 460/145 |
| 3,412,859 | A | | 11/1968 | Thornton |
| 3,460,331 | A | * | 8/1969 | Galis ..................... A01D 46/26 56/329 |
| 3,673,774 | A | * | 7/1972 | Mizzi .................... A01D 45/10 56/60 |
| 3,683,617 | A | * | 8/1972 | Vallicella ............... A01D 46/26 56/329 |
| 4,174,030 | A | | 11/1979 | Philibert |
| 4,280,616 | A | | 7/1981 | Wadensten |
| 4,380,284 | A | | 4/1983 | Ito et al. |
| 5,946,896 | A | * | 9/1999 | Daniels ................. A01D 46/264 56/330 |
| 2014/0169124 | A1 | | 6/2014 | Drennen et al. |
| 2019/0008092 | A1 | * | 1/2019 | Bertino ................... A01F 29/06 |

FOREIGN PATENT DOCUMENTS

| | | | | | |
|---|---|---|---|---|---|
| CN | 2390848 | Y | * | 8/2000 | ............. B65G 27/00 |
| CN | 203261760 | U | | 11/2013 | |
| CN | 105359724 | A | * | 3/2016 | ........... A01D 46/264 |
| CN | 105409361 | A | * | 3/2016 | ............. A01B 43/00 |
| CN | 106900277 | A | | 6/2017 | |
| CN | 108934470 | A | * | 12/2018 | ........... A01D 46/264 |
| CN | 208273610 | U | * | 12/2018 | ............. A01D 45/10 |
| CN | 109937712 | A | * | 6/2019 | ............. A01F 12/32 |
| CN | 113039935 | A | * | 6/2021 | ............. A01D 46/22 |
| FR | 2597704 | A1 | * | 10/1987 | ............. A01D 46/26 |
| GB | 2113348 | A | * | 8/1983 | ............. B06B 1/166 |
| KR | 101771239 | B1 | * | 8/2017 | ............. A01D 13/00 |

* cited by examiner

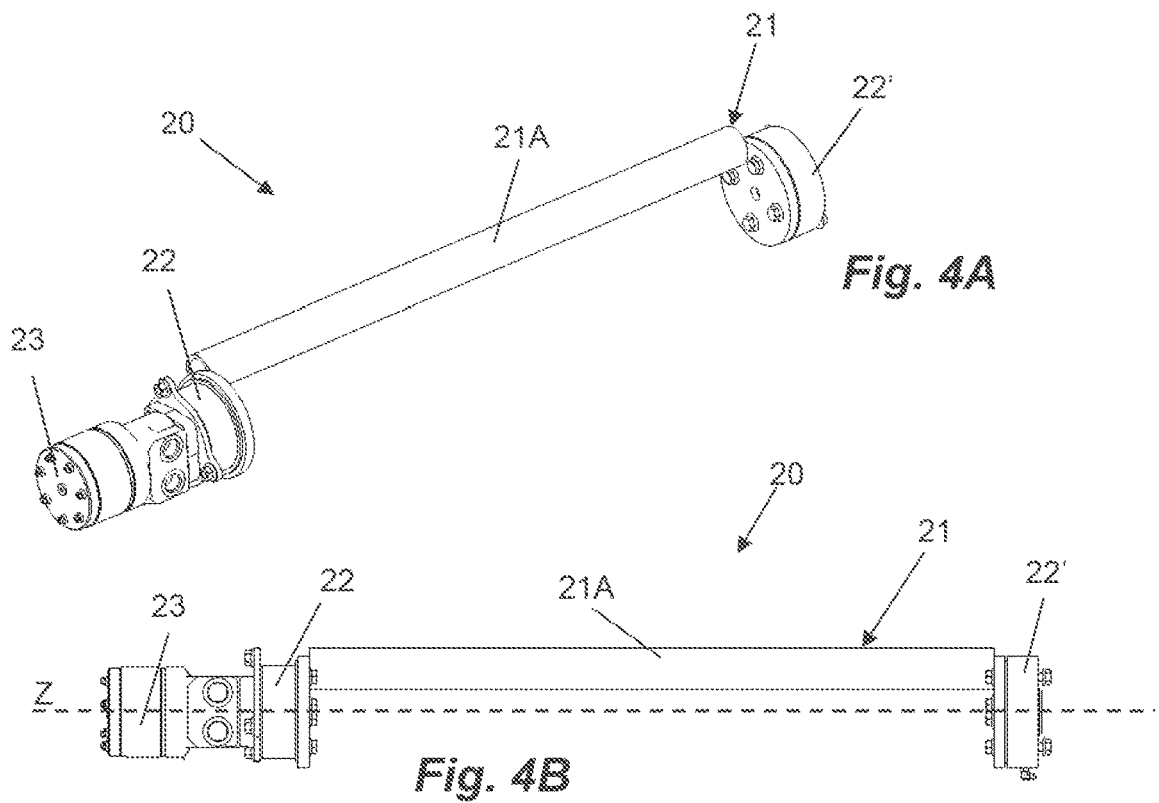
Fig. 4A
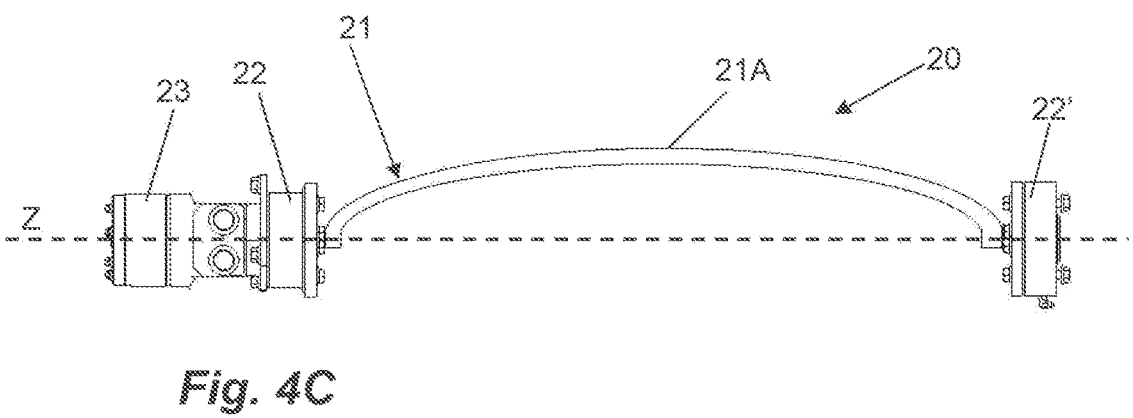
Fig. 4B
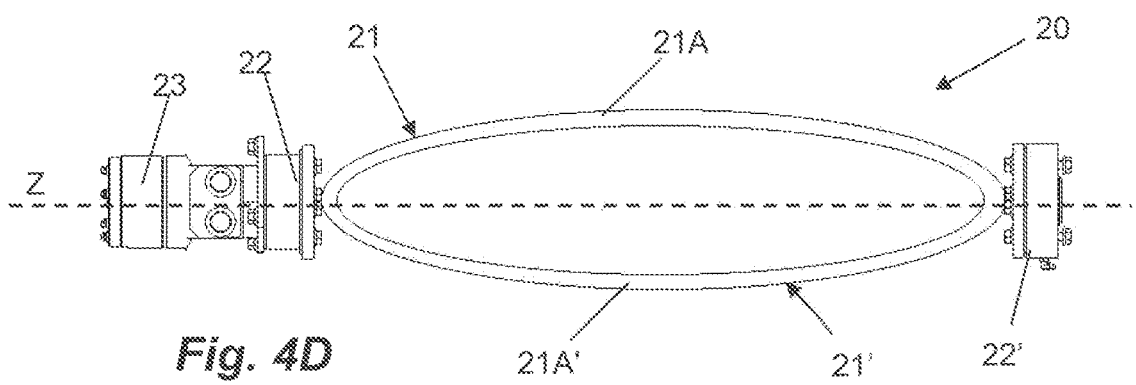
Fig. 4C
Fig. 4D

SHAKER MECHANISM FOR AN AGRICULTURAL MACHINE AND HARVESTING MACHINE

FIELD OF THE INVENTION

The present invention generally refers to a shaker mechanism used in an agricultural machine, such as sugarcane harvesters, capable of removing mud, dirt and plant remains accumulated in the lower protective tarpaulin of the chassis.

Further, the present invention also refers to a machine for harvesting tall and stalky plants, such as a sugarcane harvester, which contains said shaker mechanism.

BACKGROUND OF THE INVENTION

There are countless known models of agricultural equipment and machinery designed to promote enhanced productivity in the harvest of various types of vegetable crops, such as combine harvesters for grains, foraging machines and machines for harvesting so-called tall and stalky plants, as is the case of sugarcane and sorghum.

The machines used for harvesting these tall and stalky plants are designed and developed to promote the harvest of this specific crop, since its intrinsic characteristics require specific conditions for the appropriate processing thereof, from the cut to the transfer to transshipments and/or trucks.

Machines for harvesting of tall and stalky plants comprise a chassis that sustains the set of conveyor rollers and chopper rollers responsible for conveying and chopping the sugarcane into setts.

In the rear portion of said chassis, beneath the conveyor rollers and choppers, a series of components from the hydraulic system is installed, besides the hydraulic oil reservoir, responsible for powering and driving the various equipment and mechanisms of the harvesting machine. So, to protect these components, a protective tarpaulin is generally disposed, usually made of rubber, below said rollers to precisely protect the components and the hydraulic oil reservoir of the harvested material, which may fall on this portion of the chassis and damage the components or contaminate the hydraulic oil.

However, in practice, despite managing to prevent dirt and waste from falling onto the components of the hydraulic system and the reservoir, the protective tarpaulin ends up accumulating matter and amassing around the rollers in a significant amount, which may compromise the movement of the rollers and, consequently, affect the capacity to convey the harvested material. This drawback is further heightened when the ground and the harvested material are wet or damp, because in such conditions, the accumulated matter is a mixture of sludge, mud and plant remains which accumulate and do not run off easily, building up and drying on the surface of the tarpaulin and may affect the working of the conveyor rollers and also potentially the chopper rollers.

Therefore, it is commonplace for operators to clean these protective tarpaulins during the harvests, that is, the operators periodically stop the harvesting machine in the field and manually withdraw the accumulated matter in order to prevent blockage of the machine. These stoppages end up directly affecting the productivity of the harvest, reducing the operational effectiveness of the machine, in addition to creating insecure conditions for the operator, such as difficult access and contact with the dirt accumulated in the protective tarpaulin, a fact that ultimately requires time, disposition and individual protection equipment for the operators, so as then to handle the dirt residues.

It is therefore desirable to eliminate these stoppages and these manual cleaning processes of the protective tarpaulin disposed on the chassis beneath the conveyor rollers and choppers, whereby enabling increased productivity of the machines, but chiefly assuring the integrity and its full working. So this is the desired intention with the development of the present invention.

DESCRIPTION OF THE INVENTION

Therefore, the objective of the present invention is to provide a shaker mechanism used in a harvesting machine, such as sugarcane harvesters, which comprises technical, constructive and functional characteristics capable of enhancing and increasing the productivity of the machines in the field during the harvests.

Another objective of the present invention to provide a shaker mechanism whose purpose is to remove, periodically or not, the sludge, the mud, the dirt and the remains of plants which may accumulate in the protective tarpaulin provided in the chassis beneath the conveyor rollers and choppers of the harvesting machine. Optionally, it is also an objective of the shaker mechanism, object of the present invention, to provide conditions that prevent the accumulation of dirt on the protective tarpaulin of the mounting chassis of the rollers of the harvesting machine.

Another objective of the present invention is to provide a harvesting machine, particularly designed for harvesting tall and stalky vegetable crops, such as cane and sorghum, whose chassis comprises a shaker mechanism as commented upon above.

Yet another objective of the invention is to provide a shaker roller suitable for cleaning the protective tarpaulin provided in the chassis of the machine.

Therefore, with the purpose of achieving the technical and functional effects summarized above, among others, the present invention refers to a shaker mechanism for an agricultural machine, which comprises at least a bar whose ends are fastened on rotary support bearings, and said bar is designed to stand at least partially out from the edge of said bearings forming at least a spare surface for contact with a protective tarpaulin positioned in the chassis portion of the machine.

According to additional or alternative aspects of the invention, the following characteristics, alone or in technical possible combinations, may also be present:

said rotary support bearings are installed in respective openings provided in the chassis of the agricultural machine.

said bar comprises a cylindrical and straight format, being installed next to said bearings in an eccentric and misaligned condition in relation to the centerline of said bearings.

said bar comprises an arch shape whose central portion comprises the said spare surface for contact with the said protective tarpaulin.

said mechanism comprises two bars, which comprise an arch shape opposite each other and whose respective central portions form the spare surfaces for contact with the protective tarpaulin;

said bar may comprise the shape of a sine wave, triangular or rectangular segments or any other shape suitable for forming a spare surface;

said drive means is driven and controlled by the conductor;

said drive means is driven in a permanent condition from the start of operation of said machine;

said drive means is a hydraulic engine;

said drive means is an electric engine;

said actuator is arranged to execute the continuous movement of said bar;

said actuator is arranged to execute the alternate movement of said bar; and said bearings comprise rollers.

The invention also refers to a roller, particularly a shaker roller for cleaning the protective tarpaulin of a harvesting machine, in which the roller comprises at least a bar whose ends are fastened on rotary support bearings, and said bar is designed to stand at least partially out from the edge of said bearings forming at least a spare surface.

According to additional or alternative embodiments of this second aspect of the invention, said bar comprises an arch shape whose central portion comprises said spare surface for contact with said protective tarpaulin. Alternatively, said bar comprises a cylindrical and straight format, being installed next to said bearings in an eccentric and misaligned condition in relation to the centerline of said bearings.

The invention also refers to a harvesting machine, of the type for harvesting tall and stalky plants, formed by a chassis mounted on tracks or wheels, a drive engine, a cabin for operation and control, and at the front portion of said chassis there is provided the arrangement of the line dividers, knock-down rollers and base cutter disks, and said machine further has primary and secondary cleaning extractor systems which are interconnected by means of an elevator, said chassis is further comprised of an initial section, and a final section in where there are mounted the sets of conveyor rollers and choppers on which there is provided a protective tarpaulin, in which said chassis comprises at least a shaker mechanism, as defined above, disposed beneath said protective tarpaulin.

According to an additional characteristic of this third aspect of the invention, said harvesting machine is a machine for harvesting sugarcane.

SUMMARY DESCRIPTION OF THE DRAWINGS

The characteristics, advantages and technical effects of the present invention, as set out above, will be better understood, and more appropriately so by a person skilled in the art, based on the detailed description ahead, made on a merely exemplary and not restrictive basis of preferred embodiments, and with reference to the accompanying drawings, wherein:

FIGS. 4A and 4B show schematic views of the shaker mechanism, according to the present invention; and FIGS. 4C and 4D show schematic views of other alternative embodiments of the shaker mechanism, according to the present invention.

DESCRIPTION OF EMBODIMENTS OF THE INVENTION

The invention is now described in relation to its particular embodiments, with reference to the accompanying drawings. Said drawings are schematic, and their sizes and/or proportions may not correspond to reality, since they are intended to describe the invention didactically. Moreover, certain known and commonplace constructive details may have been omitted for greater clarity and conciseness of the description which is set out ahead. The reference numbers used are repeated throughout the drawings to identify identical or similar parts. Terms potentially used such as "above", "beneath", "front", "behind", "right", "left" etc. and variations thereof shall be interpreted in accordance with the guidance provided in FIG. 1.

Figure 1:
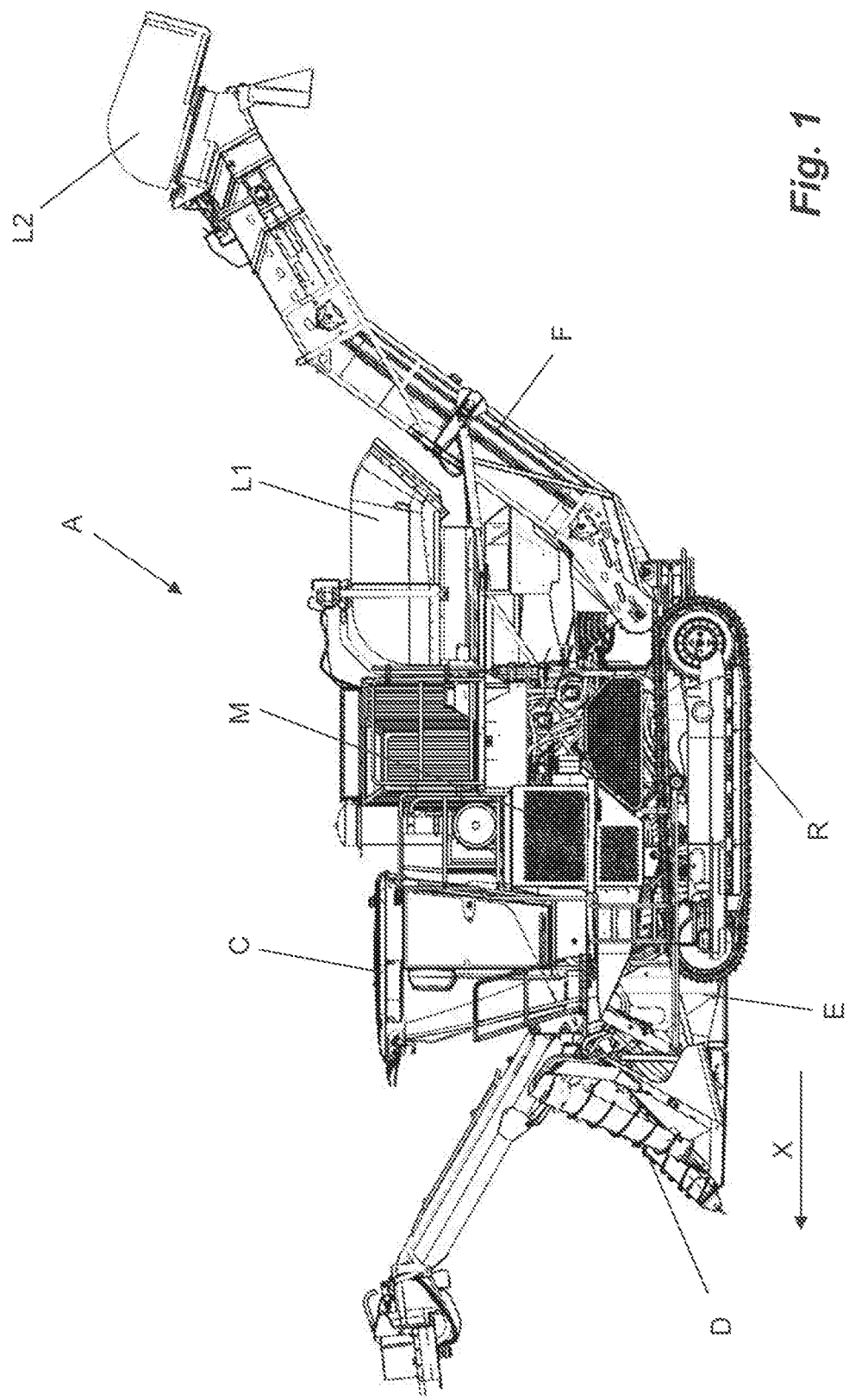
FIG. 1 is a schematic side view of a cane harvesting machine.

FIG. 1 illustrates a schematic representation of an agricultural machine (A) of the sugarcane harvester type which may comprise and receive the shaker mechanism and the roller that are the object of the present invention. The harvesting machine (A) may be, for example, a machine known in the state of the art, such as the sugarcane harvester by CNH Industrial N.V. commercialized under the trademark Case IH. The machine (A) moves over the ground in a harvesting direction, as represented by the arrow (X).

The harvesting machine (A) comprises a chassis (E) mounted on tracks (R) or wheels, a drive engine (M), a cabin for operation and control (C), and the front portion of said chassis comprises line dividers (D), knock-down rollers (T) and base cutter disks (B). The machine (A) is further provided with a primary cleaning extractor system (L1) and a secondary cleaning extractor system (L2) which are interconnected by means of an elevator (F). Alternatively, the front part of the machine can be replaced by a platform P, as represented in FIG. 2.

Figure 2:
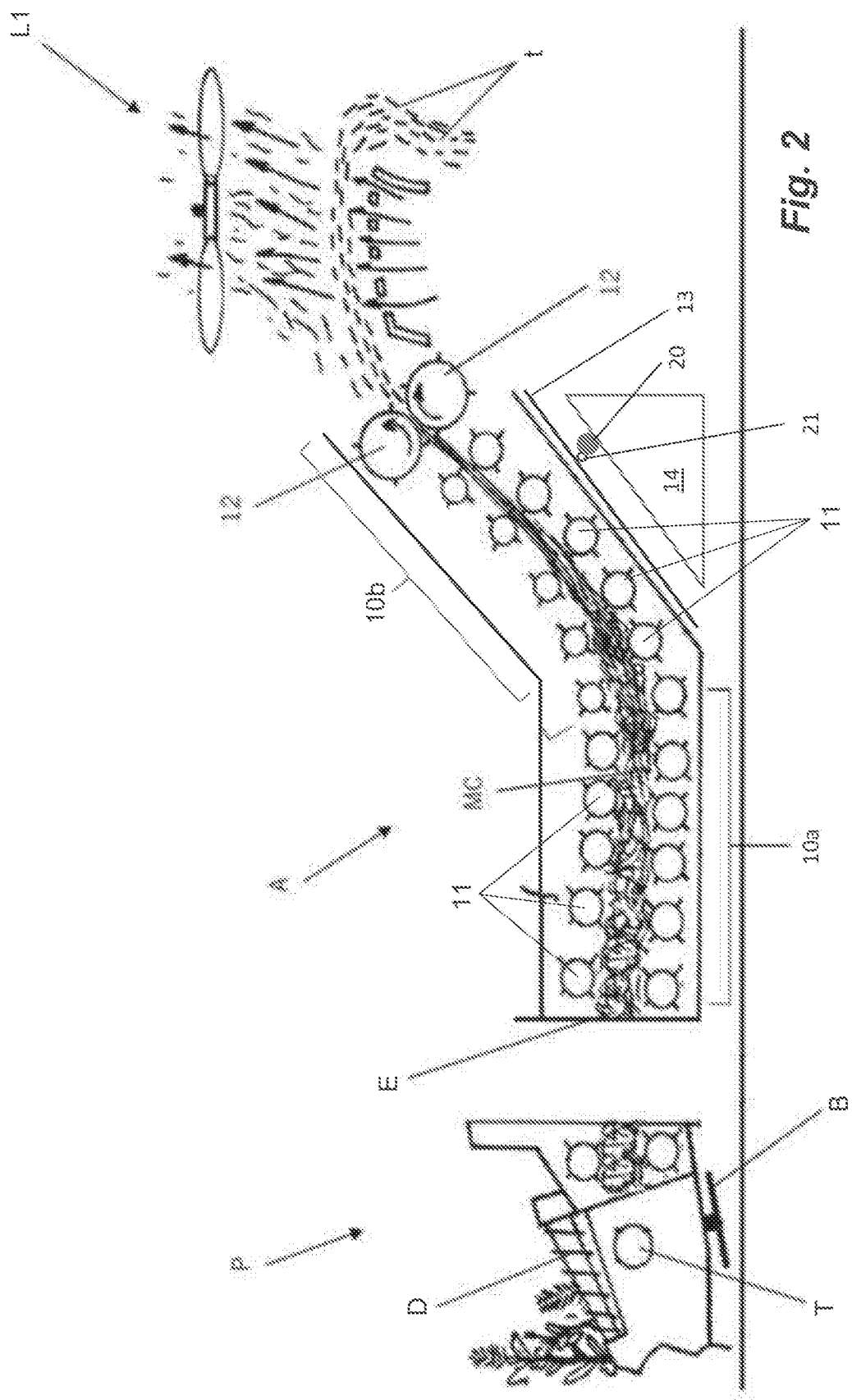
FIG. 2 is also a partial schematic side view representing the internal elements of a harvesting machine, as illustrated and represented in FIG. 1.

In relation to FIG. 2, the chassis (E) comprises a front portion 10a and a rear portion 10b on which there are mounted upper and lower conveyor rollers 11 responsible for conveying the harvested material (MC) towards the chopper rollers 12, which cut the stalk of the cane, or other stalky plant harvested, into setts (t). The primary cleaning extractor (L1) extracts and sorts the leaves and other debris harvested lighter than the setts (t), which are then conveyed to the elevator (F) and to the secondary cleaning extractor (L2) before being discharged into a container or transshipment (not illustrated), for example.

FIG. 2 also schematically shows that a protective tarpaulin 13 is disposed on the chassis to protect components and the reservoir of the hydraulic system, which are situated in the region generically indicated by reference 14. It also schematically shows the shaker mechanism 20, according to an aspect of the present invention, which is comprised by a bar 21 whose ends are fastened on rotary support bearings (22, 22') installed on respective openings 31, 31' provided on the chassis (E), on which at least one of said bearings is driven by a drive means 23 responsible for promoting the rotational movement of the bar 21. The bar is disposed under the protective tarpaulin 13. Said bar 21 is further designed to be disposed so as to stand at least partially out from the edge of said bearings 22, 22' forming at least a spare surface 21A for contact with said protective tarpaulin 13.

Figure 3:
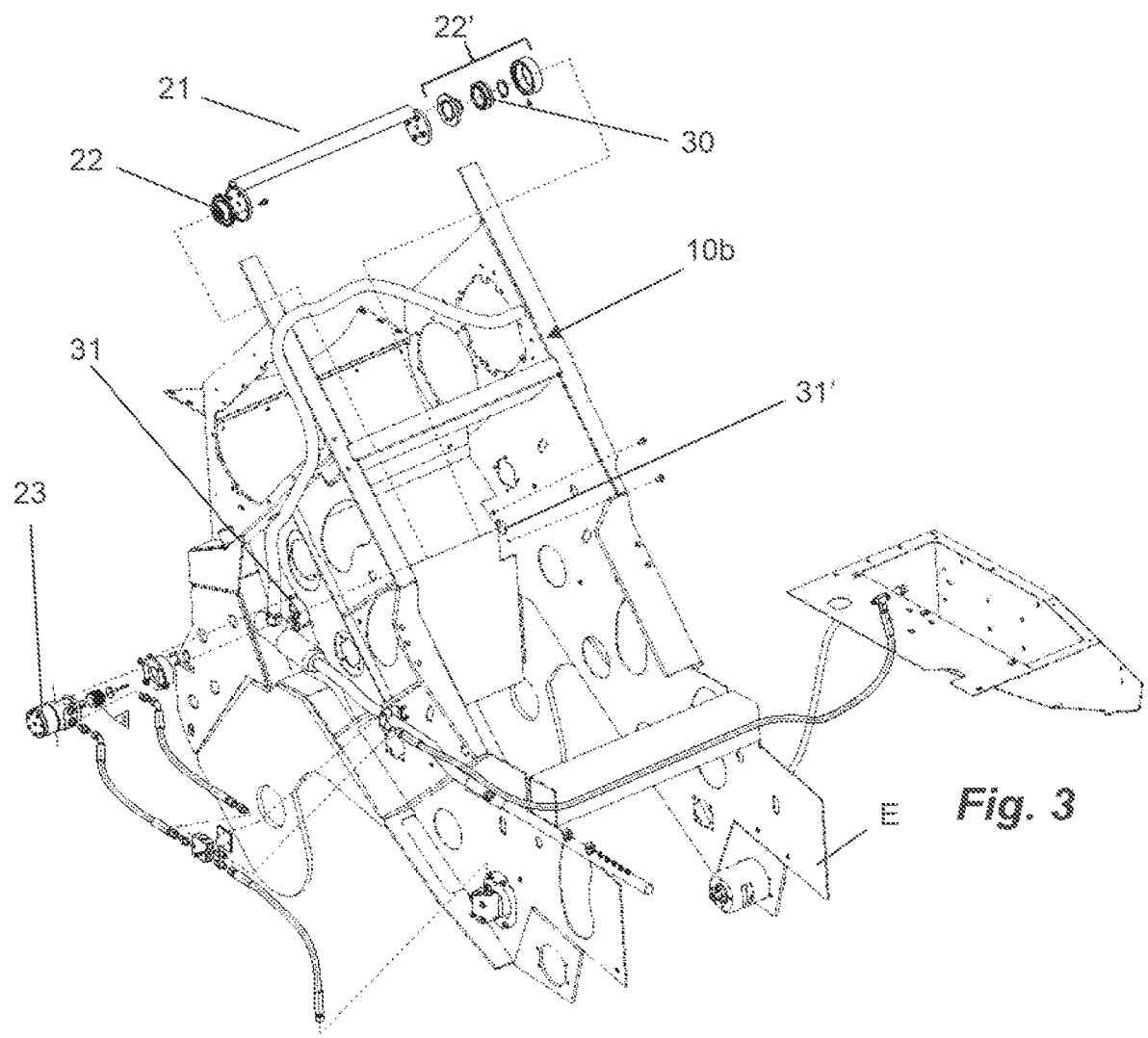
FIG. 3 is a schematic perspective view of the rear portion of the chassis, where the conveyor rollers and choppers are mounted, with the indication of the shaker mechanism, object of the present invention.

FIGS. 3 to 4B show in greater detail the rear part of the chassis 10b where the mechanism of the invention is mounted and also the shaker roller, also object of the present invention.

The bar 21 may be a cylindrical bar made of metal with a hollow arrangement to provide less weight and greater resistance to run-off. Alternatively, the metal bar may be replaced by other materials, such as polymer, elastomer, composite, ceramic, etc., and its arrangement may take on any suitable form, such as a shape having a squared profile, an H-, T- or U-shaped cross-sectional profile or any other suitable shape or profile. Further alternatively, the bar may take on a shape without a specific profile and without a specific asymmetry. As per the embodiment illustrated in FIGS. 4A and 4B, the bar 21 has an arrangement in a linear longitudinal profile, but which can naturally take on an arched arrangement, wave-shaped, jagged or any other suitable longitudinal profile to achieve the technical effect of "hitting" the tarpaulin, as clarified ahead during the course of the present description. For example, said bar 21 comprises an arch shape, as represented in FIG. 4C, disposing, in these conditions, the central portion as spare surface 21A enters into contact with the protective tarpaulin 13. Additionally, according to another embodiment of the present invention, the shaker mechanism comprises two bars in opposite arch shape 21, 21', which provide the increase in frequency of contact with the protective tarpaulin 13, considering that two spare surfaces 21A, 21A" will be disposed in contact with the protective tarpaulin 13, as represented in FIG. 4D.

The tarpaulin 13, schematically represented in FIG. 2 only, is not relevant for the object of the present invention and can be any tarpaulin or other equivalent means suitable for promoting a protective layer or barrier in order to prevent the entry of soil, mud, clay or any other dirt or debris as may be mixed up with the harvested material (MC) in the portion 14 of the chassis where the hydraulic components and reservoir are provided. The disposition, fastening and the type of tarpaulin may be determined by a person skilled in the art based on already existing harvester machines.

The rotary support bearings 22 may be any bearings suitable for enabling the rotation of the bar 21 in relation to said bearings 22, 22' and, in this sense, according to the embodiment illustrated, the bearings 22; 22' are bearings with rollers 30 and are provided to be fastened and supported on corresponding openings 31; 31' provided in the chassis E of the harvesting machine. Alternatively, the bearings can be dry bearings or lubricated bearings without rollers, or even bearings that use bushings. The type of bearing used and the fastening onto the chassis of the machine is not relevant for the scope of the invention, provided that it is possible to promote the rotation of the bar 21 in relation to the tarpaulin 13.

The drive means 23 can be any drive means suitable for promoting the rotation of the bar 21 and, according to the embodiment illustrated, it consists of a hydraulic engine to take advantage of the hydraulic line already existing in machines of this type. However, other engines or means can be employed, such as electric engines, mechanical means such as a gearbox etc. The drive means is not relevant for the scope of the invention either, provided that it promotes the rotation of the bar 21 in relation to the tarpaulin 13.

According to the embodiment illustrated, the bar 21 is disposed so as to stand at least partially out from the edge of said bearings 22, in an eccentric position to the rotation shaft Z, thus forming a spare surface 21A for contact with the protective tarpaulin 13. Alternatively, as already mentioned, the bar can be fastened at its ends in the same position as the rotation shaft Z, but presents an arched or triangular arrangement, or any other arrangement that results in a spare surface 21A for contact with the tarpaulin 14.

So, when the drive means 23 is operating, the bar 21 will move in a condition in which the spare surface 21A will come into contact with the protective tarpaulin 13 at a certain frequency and, consequently, this contact is sufficient to promote the vibration and shaking of the protective tarpaulin 13 so as to remove the dirt which may accumulate on the tarpaulin and in the vicinity of the conveyor rollers 11.

According to an embodiment of the shaker mechanism 20, the drive means 23 is driven and controlled by the operator, when he/she understands that it is necessary to remove the debris accumulated on the tarpaulin, but optionally, and depending on the working conditions to which the machine (A) is subject, the drive 23 can be connected permanently or at regular intervals and, accordingly, it is possible to prevent the build-up of dirt on said protective tarpaulin, since the contact of the spare surface 21A will promote a vibratory and constant shaking effect on the protective tarpaulin 13, eliminating the possibility of build-up.

Additionally, as commented upon above, the present invention also refers to a harvesting machine (A), particularly for tall and stalky plants, being comprised of a chassis (E) mounted on tracks (R) or wheels, a drive engine (M), a cabin for operation and control (C), and at its front portion there are provided line dividers (D), knock-down rollers (T) and base cutter disks (B), and said machine (A) further has primary (L1) and secondary (L2) cleaning extractor systems which are interconnected by means of an elevator (F). Said chassis (E) is comprised of a front portion 10a, and a rear portion 10b on which there are mounted upper and lower conveyor rollers 11 and a pair of chopper rollers 12. At the rear portion 10b, under the lower conveyor rollers, there is provided a protective tarpaulin 13, and said chassis (E) comprises at least a shaker mechanism 20 as defined by the present invention, disposed beneath said protective tarpaulin 13.

According to possible embodiments of the present invention, said harvesting machine (A) is designed and developed to promote the harvest of sugarcane and/or sorghum.

The invention also refers to a roller, particularly a shaker roller for cleaning a protective tarpaulin of a harvesting machine, and the roller comprises at least a bar (21) whose ends are fastened on rotary support bearings (22, 22'), and said bar (21) is designed to stand at least partially out from the edge of said bearings (22, 22') forming at least a spare surface (21A, 21A').

So, in light of the foregoing, it is important to clarify that the shaker mechanism 20, applied under the protective tarpaulin 13 of the machines for harvesting (A) tall and stalky plants, according to the present invention, makes it possible to obtain a significant increase in productivity of the agricultural equipment and machinery, bearing in mind that the operators no longer need to stop the harvest in the field to execute the process of cleaning the protective tarpaulin of the components and of the reservoir of the hydraulic system of the machines (A). Therefore, the operators of the machines can carry on their activities without worrying about blockages in the conveyor rollers 11 and choppers 12.

Lastly, in light of that discussed above, it is worth emphasizing that the objective of the present description is merely to present and define exemplary preferred embodiments of the shaker mechanism for protective tarpaulins of machines for harvesting tall and stalky plants, according to the present invention. Therefore, as persons skilled in the art will appreciate, various modifications and combinations of equivalent elements and details are possible without straying from the scope of protection defined in the accompanying claims.

The invention claimed is:

1. A shaker mechanism for an agricultural machine, comprising:
   at least two rotary support bearings each having an edge; and a bar having ends which are fastened to respective ones of the at least two rotary support bearings, the bar fastened to the rotary support bearings so as to stand at least partially out from the edges of the rotary support bearings, the bar forming at least a spare surface for contact with a protective tarpaulin positioned in a chassis of the machine, the protective tarpaulin positioned between the spare surface and a roller of a chassis.

2. The shaker mechanism of claim 1, wherein the chassis of the agricultural machine comprises a front portion and a rear portion, and wherein the rotary support bearings are configured to be installed in respective openings in the rear portion.

3. The shaker mechanism of claim 1, wherein the bar is cylindrically shaped and is installed on the rotary support bearings in an eccentric and misaligned condition in relation to a centerline of the rotary support bearings.

4. The shaker mechanism of claim 1, wherein the bar has an arch shape having a central portion comprising the spare surface for contact with the protective tarpaulin.

5. The shaker mechanism of claim 1, further comprising a further bar, wherein each bar has an arch shape, wherein the arch shape of each bar is opposite each other, and wherein each bar comprises a central portion forming the spare surface for contact with the protective tarpaulin.

6. The shaker mechanism of claim 1, wherein the bar has a shape of a sine wave, a triangular segment, or a rectangular segment.

7. The shaker mechanism of claim 1, further comprising a driver coupled to at least one of the rotary support bearings for driving the at least one of the rotary support bearings.

8. The shaker mechanism of claim 7, wherein the driver is a hydraulic or electric engine.

9. The shaker mechanism of claim 7, wherein the driver executes continuous movement of the bar.

10. The shaker mechanism of claim 7, wherein the driver executes alternate movement of the bar.

11. The shaker mechanism of claim 1, wherein each of the at least two rotary support bearing comprises rollers.

12. A harvesting machine for harvesting tall and stalky plants, the harvesting machine comprising:
- a chassis mounted on tracks or wheels, the chassis comprising an initial section and a final section;
- a drive engine;
- a cabin for operation and control;
- line dividers;
- knock-down rollers;
- base cutter disks;
- a primary cleaning extractor system;
- a secondary cleaning extractor system;
- an elevator interconnecting the primary and secondary extractor systems;
- a plurality of conveyor rollers disposed in the initial and final sections of the chassis;
- at least one set of chopper rollers disposed in the final section of the chassis;
- a protective tarpaulin disposed below at least one of the plurality of conveyor rollers in the final section of the chassis;
- a shaker mechanism disposed beneath the protective tarpaulin, the shaker mechanism comprising:
    - at least two rotary support bearings each having an edge; and
    - a bar having ends which are fastened to respective ones of the at least two rotary support bearings, the bar fastened to the rotary support bearings so as to stand at least partially out from the edges of the rotary support bearings, the bar forming at least a spare surface for contact with a protective tarpaulin positioned in a chassis of the machine.

13. The harvesting machine of claim 12, wherein the chassis, in the final section, comprises respective openings in which the rotary support bearings are installed.

14. The harvesting machine of claim 12, wherein the bar is cylindrically shaped and is installed on the rotary support bearings in an eccentric and misaligned condition in relation to a centerline of the rotary support bearings.

15. The harvesting machine of claim 12, wherein the bar has an arch shape having a central portion comprising the spare surface for contact with the protective tarpaulin.

16. The harvesting machine of claim 12, wherein the shaker mechanism further comprises a further bar, wherein each bar has an arch shape, wherein the arch shape of each bar is opposite each other, and wherein each bar comprises a central portion forming the spare surface for contact with the protective tarpaulin.

17. The harvesting machine of claim 12, further comprising a driver coupled to at least one of the rotary support bearings for driving the at least one of the rotary support bearings.

18. The harvesting machine of claim 17, wherein the driver is a hydraulic or electric engine.

19. The harvesting machine of claim 17, wherein the driver executes continuous or alternate movement of the bar.

20. A harvesting machine for harvesting tall and stalky plants, the harvesting machine comprising:
- a chassis mounted on tracks or wheels, the chassis comprising an initial section and a final section;
- a plurality of conveyor rollers disposed in the initial and final sections of the chassis;
- a protective tarpaulin disposed below at least one of the plurality of conveyor rollers in the final section of the chassis;
- a shaker mechanism disposed beneath the protective tarpaulin, the shaker mechanism comprising:
    - at least two rotary support bearings; and
    - a bar having ends which are fastened to respective ones of the at least two rotary support bearings and positioned vertically below the protective tarpaulin, wherein the bar is configured to contact the protective tarpaulin during rotation of the bar.

* * * * *